(12) United States Patent
Nelson

(10) Patent No.: US 6,967,422 B2
(45) Date of Patent: *Nov. 22, 2005

(54) ROTARY ACTUATOR

(76) Inventor: Victor H. Nelson, 999 Grand Blvd., Deer Park, NY (US) 11729

( * ) Notice: Subject to any disclaimer, the term of this patent is extended or adjusted under 35 U.S.C. 154(b) by 4 days.

This patent is subject to a terminal disclaimer.

(21) Appl. No.: 10/726,842

(22) Filed: Dec. 2, 2003

(65) Prior Publication Data

US 2005/0116800 A1    Jun. 2, 2005

(51) Int. Cl.⁷ ............................................. H02K 1/00
(52) U.S. Cl. ................................. 310/191; 310/39
(58) Field of Search ........................... 310/191, 37–39, 310/103, 156.01, 254, 216

(56) References Cited

U.S. PATENT DOCUMENTS

| | | | | |
|---|---|---|---|---|
| 4,500,861 | A | * | 2/1985 | Nelson ........................ 335/253 |
| 4,795,929 | A | * | 1/1989 | Elgass et al. .................. 310/36 |
| 6,518,685 | B2 | * | 2/2003 | Nelson ........................ 310/191 |

\* cited by examiner

*Primary Examiner*—Thanh Lam
(74) *Attorney, Agent, or Firm*—Charles E. Baxley

(57) ABSTRACT

A two-position rotary actuator provides a latching or holding torque which can be adjusted by altering the magnetic properties of a selected pole member. The actuator also functions as a sector motor over a selected range of angular motion and provides failsafe operation which returns the actuator to a starting position when electrical power is removed.

18 Claims, 10 Drawing Sheets

ROTARY ACTUATOR

FIELD OF THE INVENTION

The present invention relates generally to the field of actuators and more particularly to a rotary actuator in which a holding, or latching torque and return torque, may be set or varied.

BACKGROUND OF THE INVENTION

The prior art relating to electrically operated rotary actuators includes U.S. Pat. No. 6,518,685 for a Multi-Position Actuator or Sector Motor. Such an apparatus is essentially a three position actuator which includes three electromagnetic poles. An air gap of one or more of the electromagnetic poles is made different from an air gap of the remaining pole or poles in order to adjust operating characteristics of the actuator. The gap can be set for operation as a limited range actuator or as a continuous rotating device.

OBJECTS AND SUMMARY OF THE INVENTION

It is an object of the present invention to provide a two position rotary actuator in which the latching torque can be varied easily.

ANOTHER OBJECT of the present invention is to provide a bi-directional rotary actuator whose return torque to an initial position, when electrical power is removed, may be varied.

YET ANOTHER OBJECT of the present invention is to provide a rotary actuator which comprises a relatively small number of component parts resulting in reliable long term operation.

The foregoing objects and advantages of the invention will appear more clearly hereinafter.

In accordance with the present invention there is provided a two-position rotary actuator which includes three poles and which has a latching or holding torque which can be adjusted by altering magnetic properties of a selected one of the three poles.

The actuator also functions as a sector-motor over a selected range of angular motion. Failsafe operation is provided whereby the actuator returns to a starting position when electrical power is removed and return torque of the actuator may be adjusted by altering magnetic properties of a selected one of the three poles.

BRIEF DESCRIPTION OF THE DRAWINGS

Other important objects and advantages of the present invention will be apparent from the following detailed description of the invention taken in connection with the accompanying drawings in which.

DETAILED DESCRIPTION OF THE INVENTION

Figure 1:
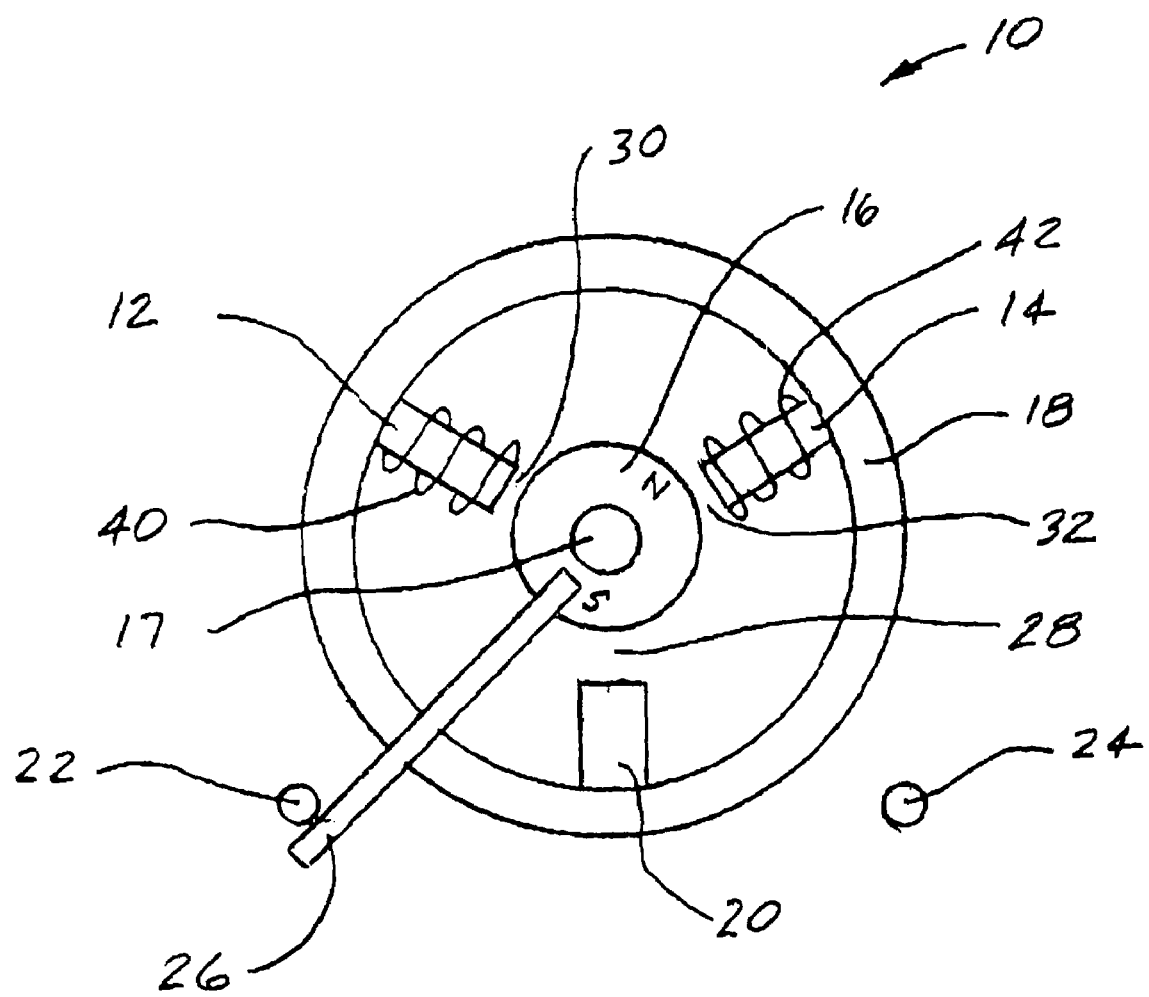
FIG. 1 is a schematic view of a rotary actuator according to the present invention.

With reference to the drawings there is shown in FIG. 1, a rotary actuator 10 made in accordance with the present invention which includes a pair of poles 12, 14 positioned around a permanent magnet radially magnetized with north and south pole armature 16. Surrounding the poles 12, 14 and the armature 16 is a housing 18. The housing 18 preferably is made of soft iron. Poles 12, 14 are made of a magnetic material such as soft iron. The rotary actuator also includes a third pole 20. The three poles 12, 14 and 20 generally are equally spaced within the housing 18. The permanent magnet usually is neodymium, alnico or a similar material.

The rotary actuator 10 includes a pair of stops 22, 24 which, as shown in FIG. 1, are positioned typically at minus forty-five degrees (−45°) and plus forty-five degrees (+45°) from a zero degree (0°) position. As is shown in FIG. 1, the zero degree (0°) position is defined by the position of the third pole 20. The stops 22, 24 engage a stop arm 26 which projects from the armature 16 and which limits motion of the armature 16. The armature 16 is mounted on a bearing 17 for rotation relative to the housing 18. The armature 16 includes a permanent magnet with radial north and south poles that interact with the stationary poles to produce rotation.

Figure 2:
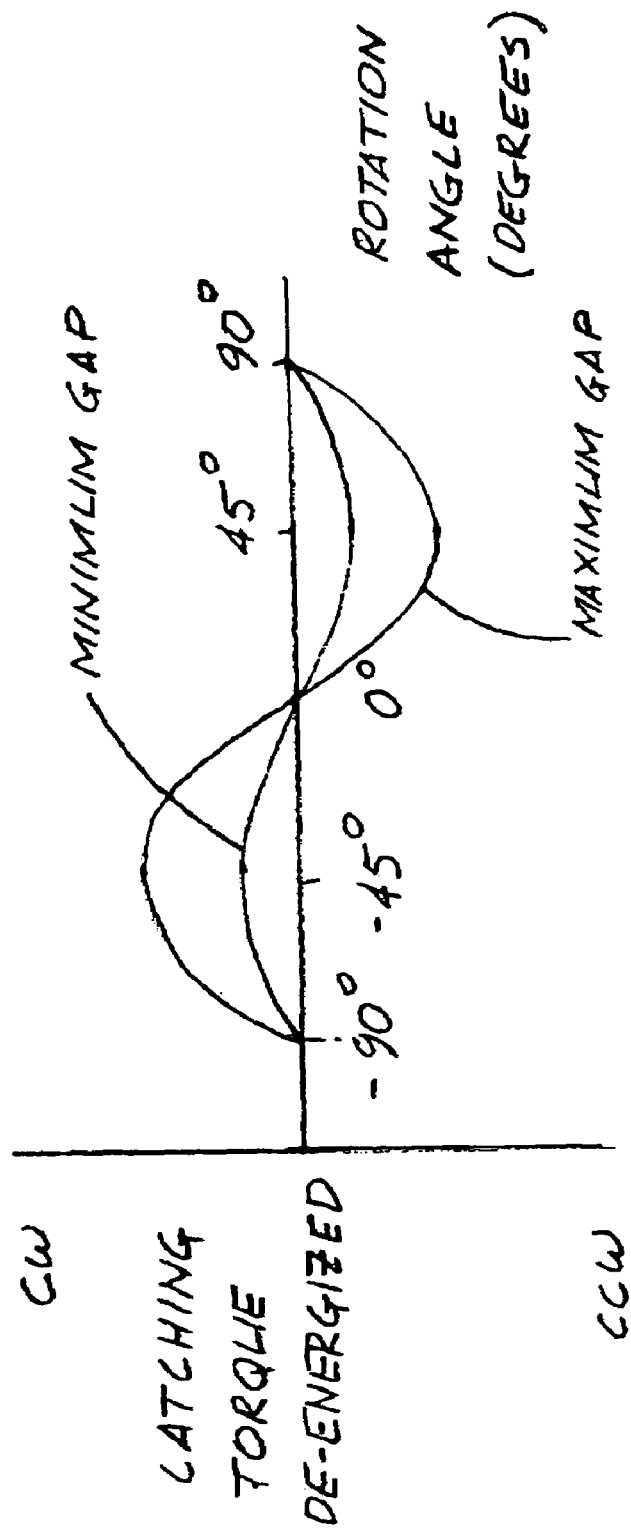
FIG. 2 is a plot of a graph showing a range of latching torque plotted against rotational position of the actuator.

An air gap 28 provided for the pole 20, is different from air gaps 30, 32 provided for the poles 12, 14. And the air gap difference results in a difference in magnetic behavior of the pole 20 relative to the magnetic behavior of the poles 12, 14. The difference in magnetic behavior results in a latching torque during a de-energized state of the rotary actuator 10 as is shown in FIG. 2 to stops 24 and 26. The air gap 28 as shown in FIG. 1 is larger than the air gaps 30, 32. Alternatively, the air gap 28 may be made smaller than the air gaps 30, 32, resulting in a latching torque to the zero (0°) position. FIG. 2 shows a range of latching torque determined by the differences in magnetic behavior between pole 20 and poles 12 and 14. For gap 28 larger than gaps 30 or 32.

When the stop arm 26 contacts each of the stops 22, 24 there is a holding or latching torque present whose magnitude depends on difference in the magnetic behavior of the pole 20 relative to the poles 12 and 14. If each of the poles 12, 14, 20 had exactly equal magnetic behavior with equal air gaps 28, 30, 32 there would be zero latching torque. A maximum latching torque is obtained when the gap 28 is a maximum or when pole 20 of FIG. 1 is omitted. The omission of the pole 20 results in a non-symmetrical configuration of the poles 12, 14 relative to the armature 16.

Figure 4:
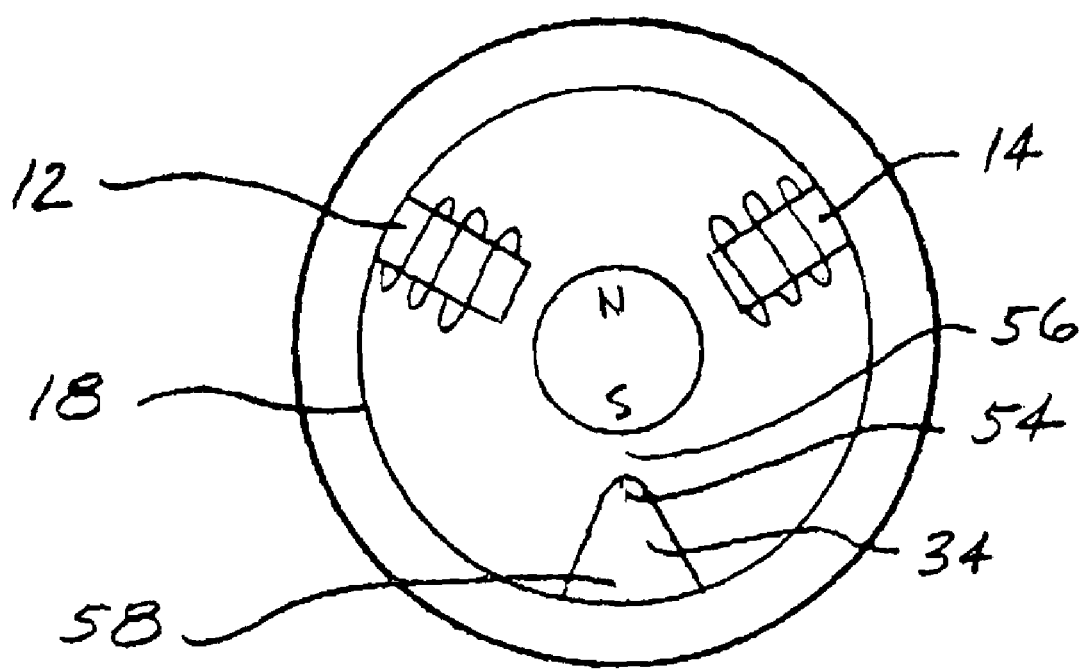
FIG. 4 is a schematic view of an actuator according to the invention in which the shape of the pole is varied.
Figure 6:
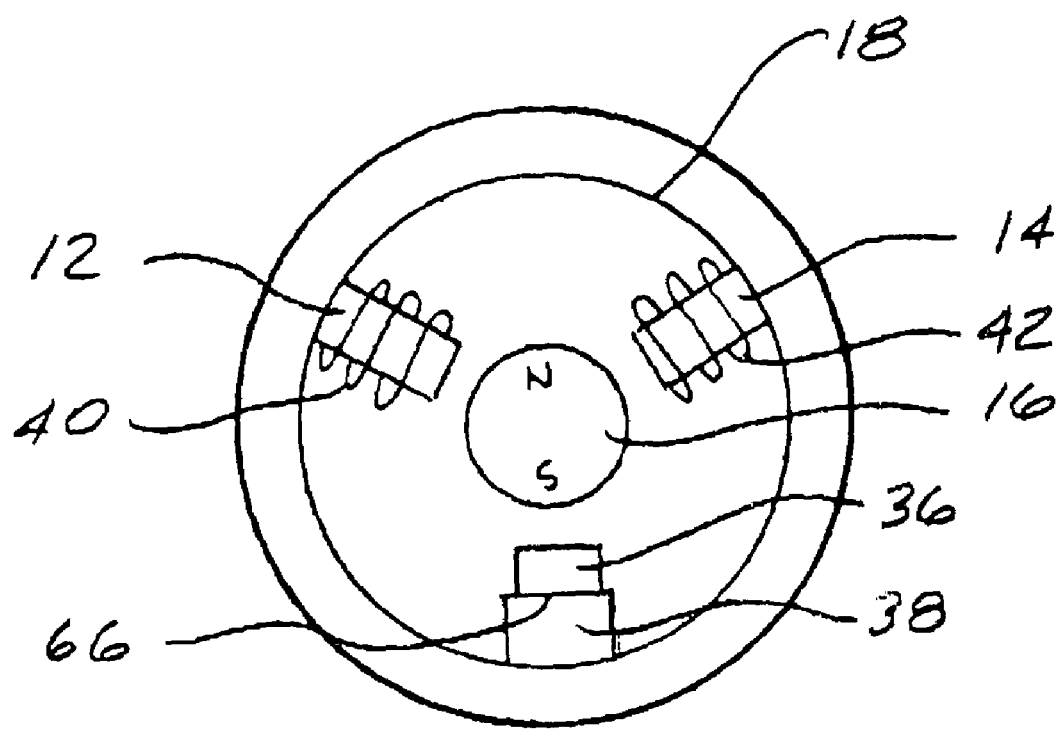
FIG. 6 shows an actuator according to the invention which incorporates a permanent magnetic.

The latching torque may also be altered by altering shape of pole 34, as is shown in FIG. 4, and/or by altering material of the pole or mounting a permanent magnet 36 to the pole 38, as is shown in FIG. 6.

Applying electrical power to the coils 40, 42 on the poles 12, 14 produces a useful sector motor, by overcoming the latching or holding torque and driving the armature 16, which may be connected to a load, through a range established by the stops 22, 24.

Figure 3:
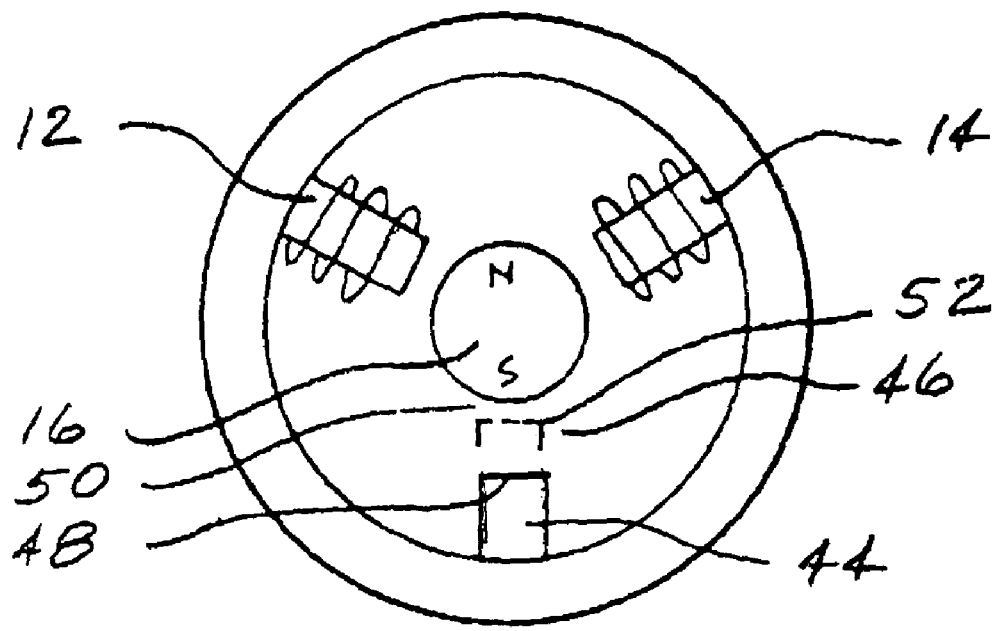
FIG. 3 is a schematic view showing variation of air gap of one of the poles.

FIG. 3 shows a pole 44 which has a relatively large air gap 46 or space between the end 48 of the pole 44 and the armature 16. This air gap may be varied from the relatively large gap 46 as is shown to a relatively narrow gap 50 which is indicated schematically by the broken lines 52 in FIG. 3 thereby increasing the latching torque or decreasing the hold torque accordingly.

FIG. 4 shows a pole 34, according to the present invention, which has a cross-sectional area which increases from a relatively narrow portion relatively close the air gap 56) to a relatively wide portion 58 disposed relatively close to the housing 18.

Figure 5:
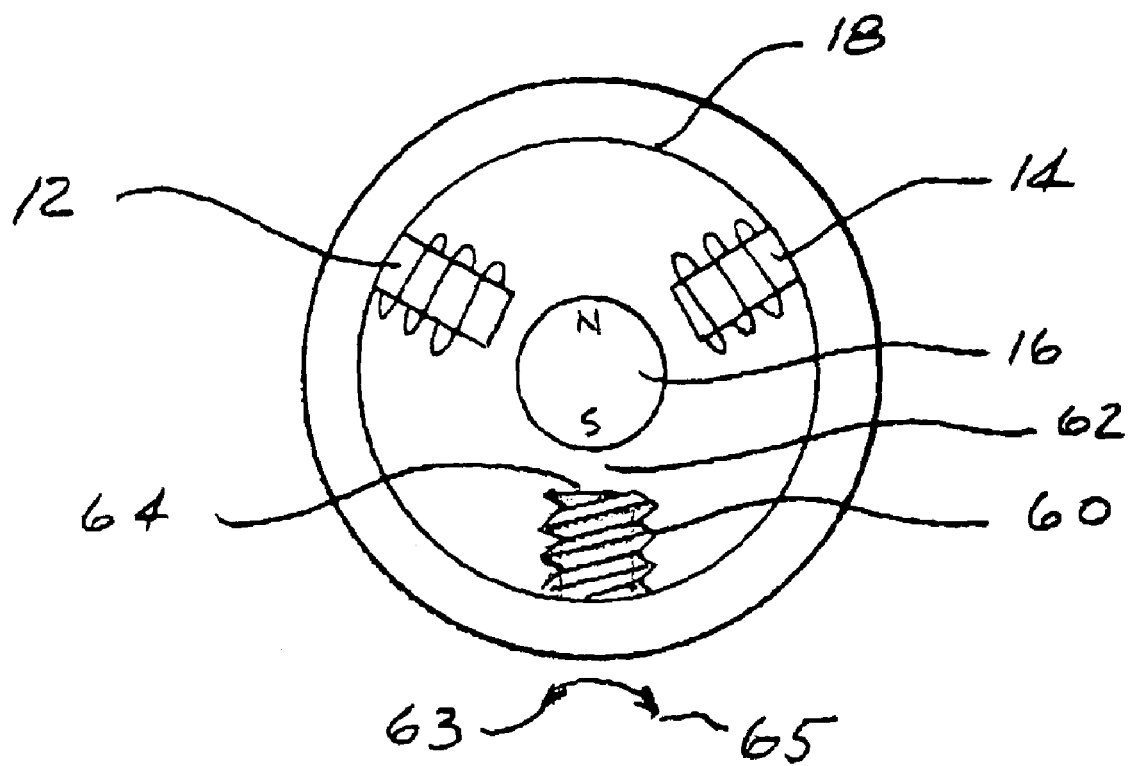
FIG. 5 shows an actuator according to the invention which incorporates a screw adjustment.

FIG. 5 shows a threaded pole member 60 which is made of a ferromagnetic material. The pole member 60 is threadably received in the housing 18 and rotation of the pole member 60 relative to the housing as shown by arrows 63, 65 and facilitates adjustment of the air gap 62 between the end 64 of the pole member 60 and the armature 16.

FIG. 6 shows a pole member 38 which incorporates a permanent magnet 36 which is mounted on an end 66 of the pole member 38. The pole member 38 may be made of a ferromagnetic material.

FIGS. 3–6 thus illustrate various pole member configurations of the present invention which provide a range of magnetic properties that differ from each other and also differ from the pole members 12 and 14.

Figure 7:
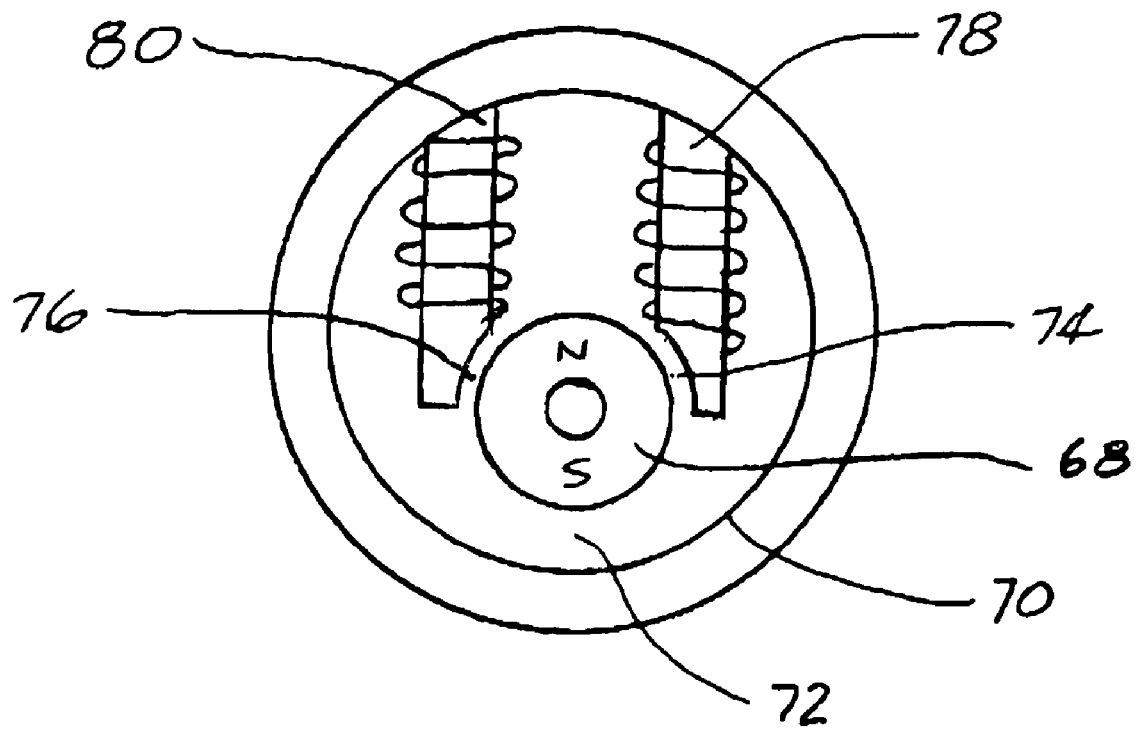
FIG. 7 shows an actuator whose armature is spaced close to a housing wall to provide added winding capability along with latching torque.

FIG. 7 shows spacing the armature assembly 68 close to the housing wall 70 to inherently produce a suitable gap 72, different than gap 74 or 76 and to provide an increased winding capability on poles 78, 80 to provide more ampere turns which will increase the drive torque.

Figure 8:
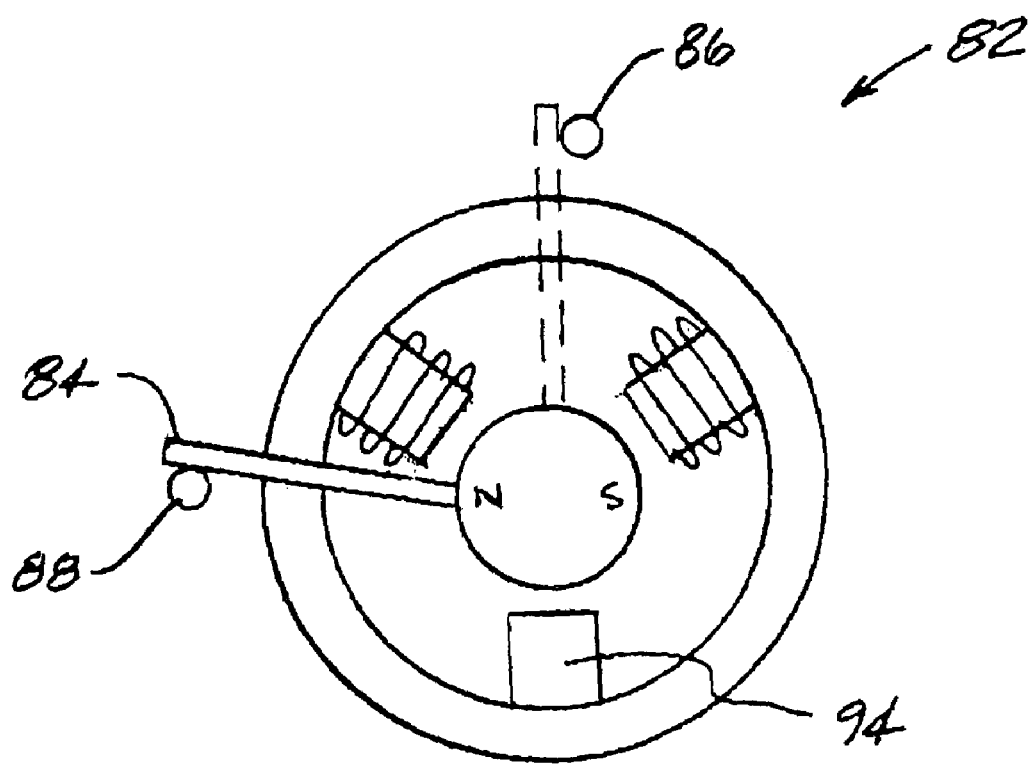
FIG. 8 shows a failsafe actuator with limited range.
Figure 8A:
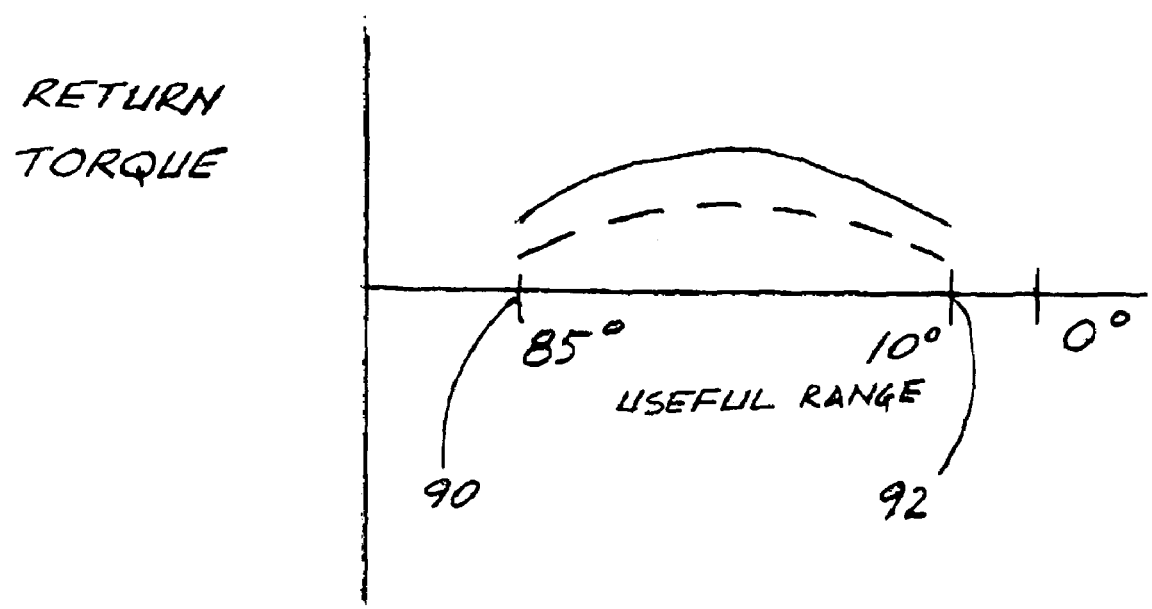
FIG. 8A is a plot of a graph showing the limited range of return torque of the actuator against rotational position of the failsafe actuator.
Figure 9:
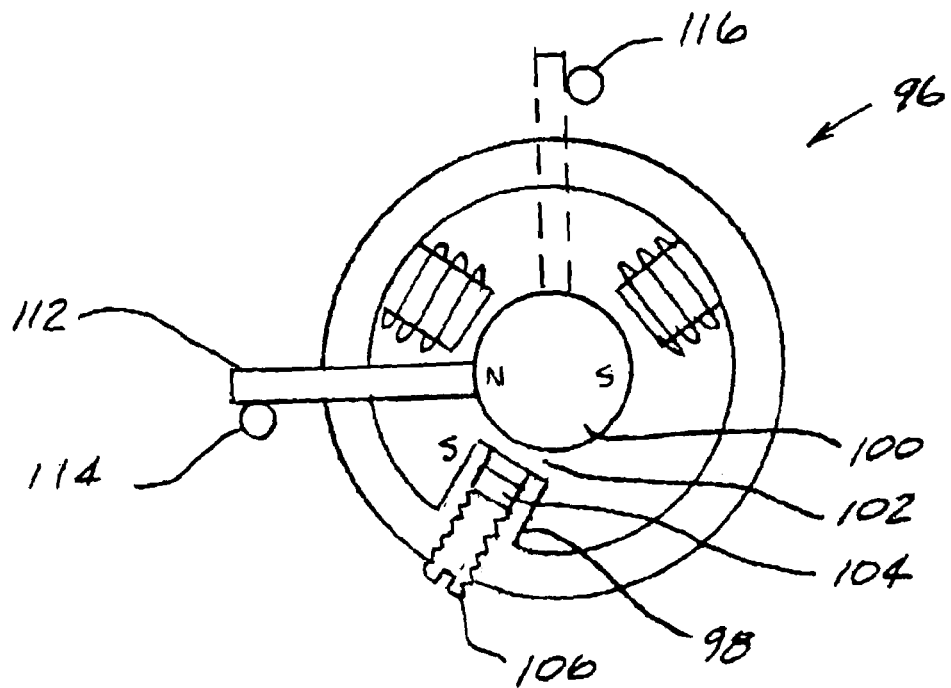
FIG. 9 shows a failsafe actuator with extended range which includes an angularly offset magnetic pole.
Figure 9A:
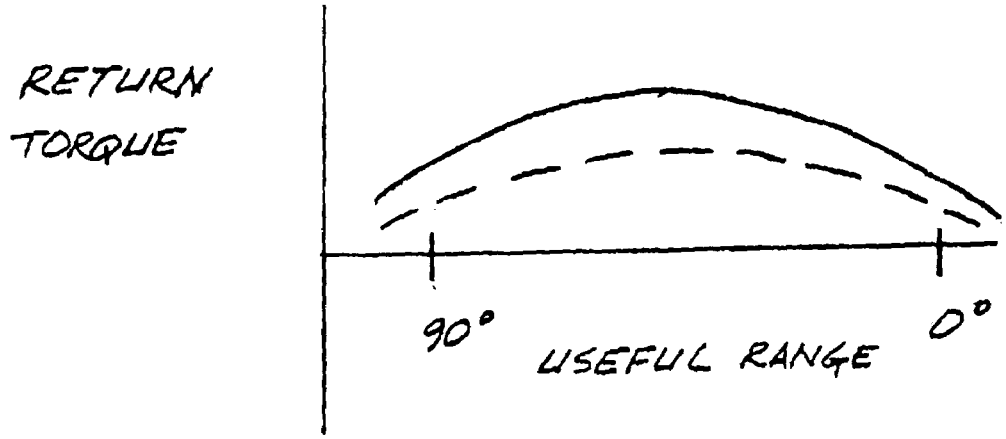
FIG. 9A is a plot of the extended range return torque for the unit in FIG. 9.

FIG. 8 illustrates the failsafe operation of the actuator 82. When powered, the actuator 82 drives the stop arm 84 to the stop 86. Removing the power returns the stop arm 84 to the stop 88. The actuator 82 thus provides a failsafe mode. FIG. 8A also illustrates the useful range of the actuator which extends between the vertical marks 90, 92, This range extends from approximately 10° to approximately 85°. As shown in FIG. 8A, in broken lines the return or the latching torque may be changed by altering the magnetic properties of pole 94. As is shown in FIG. 9 the useful range of the actuator 86 may be extended 90° and beyond 90° by incorporating the pole 98 which is similar to the pole 28 shown in FIG. 6. The pole 98 is angularly offset to react against the armature magnet 100. The return torque may be varied by altering the gap 102 by adjusting the position of the magnet 104 by rotating the adjustment screw 106. The variation in return torque is illustrated by the variation illustrated by the solid line 108 and the broken line 110 in FIG. 9A. The actuator 96 includes the stop arm 112 and the stops 114 and 116.

The foregoing specific embodiments of the present invention as set forth in the specification herein are for illustrative purposes only. Various deviations and modifications may be made within the spirit and scope of this invention without departing from a main theme of invention delineated more specifically in claims that follow herein.

I claim:
1. A rotary actuator comprising:
    a housing;
    an armature containing a permanent magnet with radially north and south poles mounted rotatably in said housing:
    a plurality of pole members mounted in said housing, with said pole members journaled around said armature, with said pole members each comprising;
    a ferromagnetic material and with at least one of said plurality of pole members having magnetic properties different than the remaining pole members;
    a first stop member mounted on said housing;
    at least one stop arm, with said stop arm projecting from said armature and disposed to engage said stop member to limit rotation of said armature.
2. The rotary actuator as claimed in claim 1, wherein said housing is made of a ferromagnetic material and said permanent magnet is made of neodymium, samarium, cobalt or other rare earth material.
3. The rotary actuator as claimed in claim 1, wherein at least two of said plurality of pole members further include a winding thereby forming electro-magnetic poles.
4. The rotary actuator as claimed in claim 1, wherein each of said plurality of pole members further include:
    an air gap formed between each of said plurality of pole members and said armature, and wherein said at least one of said pole members has magnetic properties different than said remaining pole members and has an air gap differing in size from each of said air gaps formed between the respective remaining poles and said armature.
5. The rotary actuator as claimed in claim 1, wherein each of said plurality of pole members further includes:
    a selected shape, with said selected shape of said at least one of said plurality of pole members having magnetic properties different from the respective remaining pole members and having a selected shape different than said selected shape of said respective remaining pole members.
6. The rotary actuator as claimed in claim 1, wherein said at least one of said plurality of pole members further includes a permanent magnet.
7. The rotary actuator as claimed in claim 1, wherein said at least one of said plurality of pole members includes:
    a non-ferromagnetic material pole; and
    a permanent magnet mounted on said non-ferromagnetic material pole member.
8. The rotary actuator as claimed in claim 1, wherein said at least one of said plurality of pole members is made of a non-ferromagnetic material.
9. The rotary actuator as claimed in claim 1, further including:
    an armature spaced relatively close to said housing to create a gap between said armature of said housing thereby providing additional winding capability on said pole members for greater drive torque.
10. The rotary actuator as claimed in claim 1 further including air gap adjustment means, with said air gap adjustment means disposed on said at least one of said plurality of pole members.

11. The rotary actuator as claimed in claim 1, further including a plurality of coil windings with said coil windings mounted on selected pole members to perform as electromagnetic poles.

12. The rotary actuator as claimed in claim 1, with said at least one pole member movably disposed relative to said armature.

13. The rotary actuator as claimed in claim 1, wherein a differential between said magnetic properties of said at least one of said plurality of pole members and said magnetic properties of the remaining pole members defines a failsafe torque.

14. The rotary actuator as claimed in claim 10 wherein said air gap adjustment means includes a threaded pole member threadably engaged in said housing.

15. The rotary actuator as claimed in claim 1 further including a second stop member with said first and said second stop members disposed to limit the motion of said stop arm.

16. The rotary actuator as claim 1 wherein said magnet is made of alnico.

17. The rotary actuator as claimed in claim 1 wherein said housing is made of a magnetic metal and said permanent magnet is made of neodymium, samarium, cobalt or other rare earth material.

18. The rotary actuator as claimed in claim 1 wherein at least one of said plurality of pole members is omitted thereby providing a non-symmetrical configuration of said pole members relative to said armature.

* * * * *